(12) United States Patent
Pendleton et al.

(10) Patent No.: US 7,239,628 B1
(45) Date of Patent: Jul. 3, 2007

(54) LINE-POWERED NETWORK INTERFACE DEVICE

(75) Inventors: Matthew A. Pendleton, Cedar Park, TX (US); Timothy J. Hurd, Bastrop, TX (US); Anthony H. Anconetani, Round Rock, TX (US); Donald L. Sparks, Austin, TX (US)

(73) Assignee: GenBand Inc., Austin, TX (US)

( * ) Notice: Subject to any disclaimer, the term of this patent is extended or adjusted under 35 U.S.C. 154(b) by 1007 days.

(21) Appl. No.: 10/136,508

(22) Filed: May 1, 2002

(51) Int. Cl.
*H04L 12/66* (2006.01)

(52) U.S. Cl. .................. 370/352; 370/353; 370/354; 370/355; 370/356; 370/357; 370/360; 370/396; 370/466; 370/467; 370/473

(58) Field of Classification Search ............. 370/463, 370/359, 419, 535, 352–356, 337, 347, 389, 370/282, 422, 485, 493, 465, 480; 379/413, 379/93.36, 322, 395.01, 90.01, 102.04, 219, 379/242, 399

See application file for complete search history.

(56) References Cited

U.S. PATENT DOCUMENTS

| 4,381,427 A | 4/1983 | Cheal et al. ............. 179/2 DP |
| 4,493,092 A | 1/1985 | Adams ....................... 375/36 |
| 4,504,942 A | 3/1985 | Aro et al. .................... 370/58 |
| 4,507,793 A | 3/1985 | Adams ....................... 375/36 |
| 4,512,025 A | 4/1985 | Frankel et al. ............... 375/36 |
| 4,578,537 A | 3/1986 | Faggin et al. ............ 179/2 DP |
| 4,608,686 A | 8/1986 | Barsellotti ................. 370/69.1 |
| 4,627,046 A | 12/1986 | Bellamy ...................... 370/58 |
| 4,740,963 A | 4/1988 | Eckley .................... 370/110.1 |
| 4,748,656 A | 5/1988 | Gibbs et al. .................. 379/93 |
| 4,853,949 A | 8/1989 | Schorr et al. ................. 379/2 |
| 4,881,226 A | 11/1989 | Lechner et al. .......... 370/110.1 |
| 4,903,292 A | 2/1990 | Dillon ......................... 379/93 |
| 5,033,062 A | 7/1991 | Morrow et al. ................. 375/7 |
| 5,034,948 A | 7/1991 | Mizutani et al. .............. 370/79 |
| 5,042,028 A | 8/1991 | Ogawa ...................... 370/58.2 |
| 5,127,003 A | 6/1992 | Doll, Jr. et al. .......... 370/110.1 |
| 5,134,611 A | 7/1992 | Steinka et al. ................ 370/79 |
| 5,142,568 A | 8/1992 | Ogata et al. ................ 379/100 |

(Continued)

FOREIGN PATENT DOCUMENTS

EP 0 789 470 A2 8/1997

(Continued)

OTHER PUBLICATIONS

L. Van Hauwermeiren et al., "Offering Video Services over Twisted Pair Cables to the Residential Subscriber by means of an ATM based ADSL Transmission System," *ISS Symposium*, vol. 1, Apr. 1995, 3 pages.

(Continued)

*Primary Examiner*—Raj K. Jain
(74) *Attorney, Agent, or Firm*—Baker Botts L.L.P.

(57) ABSTRACT

A network interface device includes a first interface, a power extractor, a transceiver, and a second interface. The first interface receives a signal that includes both power and packetized information. The power extractor extracts the power from the signal and powers the transceiver. The transceiver extracts the packetized information from the signal and communicates the information to a user device using the second interface.

10 Claims, 4 Drawing Sheets

U.S. PATENT DOCUMENTS

| | | | |
|---|---|---|---|
| 5,142,571 A | 8/1992 | Suzuki et al. | 379/279 |
| 5,151,923 A | 9/1992 | Fujiwara | 375/5 |
| 5,216,704 A | 6/1993 | Williams et al. | 379/93 |
| 5,220,560 A | 6/1993 | Ogasawara | 370/79 |
| 5,247,347 A | 9/1993 | Litteral et al. | 358/85 |
| 5,267,300 A | 11/1993 | Kao et al. | 379/93 |
| 5,305,312 A | 4/1994 | Fornek et al. | 370/62 |
| 5,317,627 A | 5/1994 | Richardson, Jr. et al. | 379/88 |
| 5,349,640 A | 9/1994 | Dunn et al. | 379/387 |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,459,788 A | 10/1995 | Kim | 379/399 |
| 5,473,675 A | 12/1995 | Chapman et al. | 379/93 |
| 5,479,447 A | 12/1995 | Chow et al. | 375/260 |
| 5,493,609 A | 2/1996 | Winseck, Jr. et al. | 379/96 |
| 5,499,241 A | 3/1996 | Thompson et al. | 370/73 |
| 5,535,198 A | 7/1996 | Baker et al. | 370/60 |
| 5,604,737 A | 2/1997 | Iwami et al. | 370/352 |
| 5,610,922 A | 3/1997 | Balatoni | 370/468 |
| 5,613,069 A | 3/1997 | Walker | 395/200 |
| 5,617,423 A | 4/1997 | Li et al. | 370/426 |
| 5,625,685 A | 4/1997 | Allegranza et al. | 370/399 |
| 5,638,363 A | 6/1997 | Gittins et al. | 370/358 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,719,870 A | 2/1998 | Baker et al. | 370/463 |
| 5,737,333 A | 4/1998 | Civanlar et al. | 370/352 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,787,088 A | 7/1998 | Dagdeviren et al. | 370/493 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,864,747 A | 1/1999 | Clark et al. | 455/3.2 |
| 5,878,120 A | 3/1999 | O'Mahony | 379/93.09 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A | 5/1999 | McHale et al. | 379/93.14 |
| 5,917,814 A | 6/1999 | Balatoni | 370/352 |
| 5,936,952 A | 8/1999 | Lecomte | 370/352 |
| 5,940,479 A | 8/1999 | Guy et al. | 379/93.01 |
| 5,943,404 A | 8/1999 | Sansom et al. | 379/93.06 |
| 5,949,763 A | 9/1999 | Lund | 370/261 |
| 5,974,043 A | 10/1999 | Solomon | 370/352 |
| 5,978,390 A | 11/1999 | Balatoni | 370/540 |
| 5,999,565 A | 12/1999 | Locklear, Jr. et al. | 375/222 |
| 5,999,598 A | 12/1999 | Henrick et al. | 379/93.07 |
| 6,075,784 A | 6/2000 | Frankel et al. | 370/356 |
| 6,081,517 A | 6/2000 | Liu et al. | 370/352 |
| 6,118,780 A | 9/2000 | Dunn et al. | 370/355 |
| 6,125,117 A | 9/2000 | Martin et al. | 370/397 |
| 6,130,879 A | 10/2000 | Liu | 370/230 |
| 6,181,715 B1 | 1/2001 | Phillips et al. | 370/493 |
| 6,222,829 B1 | 4/2001 | Karlsson et al. | 370/329 |
| 6,259,708 B1 | 7/2001 | Cheng et al. | 370/493 |
| 6,650,635 B1 * | 11/2003 | Weinstein et al. | 370/352 |
| 6,996,134 B1 * | 2/2006 | Renucci et al. | 370/535 |

FOREIGN PATENT DOCUMENTS

| | | |
|---|---|---|
| EP | 0 841 831 A2 | 5/1998 |
| GB | 2 313 979 A | 12/1997 |
| WO | WO 97/23078 | 6/1997 |
| WO | WO 97/37458 | 10/1997 |
| WO | WO 99/49608 | 9/1999 |
| WO | WO 01/06720 A1 | 1/2001 |
| WO | WO 01/13593 A1 | 2/2001 |
| WO | WO 01/13618 A1 | 2/2001 |

OTHER PUBLICATIONS

Krishna Gudapati et al., "Local Telephone Service for Cable Subscribers Using Packet Switched Access," XP-000704483, *ISS*, Sep. 21, 1997, 5 pages.

"Electrical Safety Criteria," Section 7 of "Electromagnetic Compatibility and Electrical Safety—Generic Criteria for Network Telecommunications Equipment," Generic Requirements GR-1089-CORE, Issue 2, Dec. 1997, *Bellcore*, includes Contents, List of Figures, List of Tables, Preface, and Introduction (Section 1), 44 total pages.

Timothy C. Kwok, "Residential Broadband Architecture Over ADSL and G.Lite (G.992.2): PPP Over ATM," XP-000830885, *IEEE Communications Magazine*, May 1999, 6 pages.

International Search Report in International Application No. PCT/US 00/19412, dated Oct. 19, 2000, 7 pages.

International Search Report in International Application No. PCT/US 01/00887, dated May 2, 2001, 6 pages.

International Search Report in International Application No. PCT/US 01/00885, dated Jun. 29, 2001, 7 pages.

Clougherty et al., "The AnyMedia® Access System-Providing Solutions for Distribution and Network," XP-000851513, *Bell Labs Technical Journal*, Apr.-Jun. 1999, pp. 98-127.

PCT International Search Report in International Application No. PCT/US 01/44491, dated Jun. 3, 2002, 7 pages.

* cited by examiner

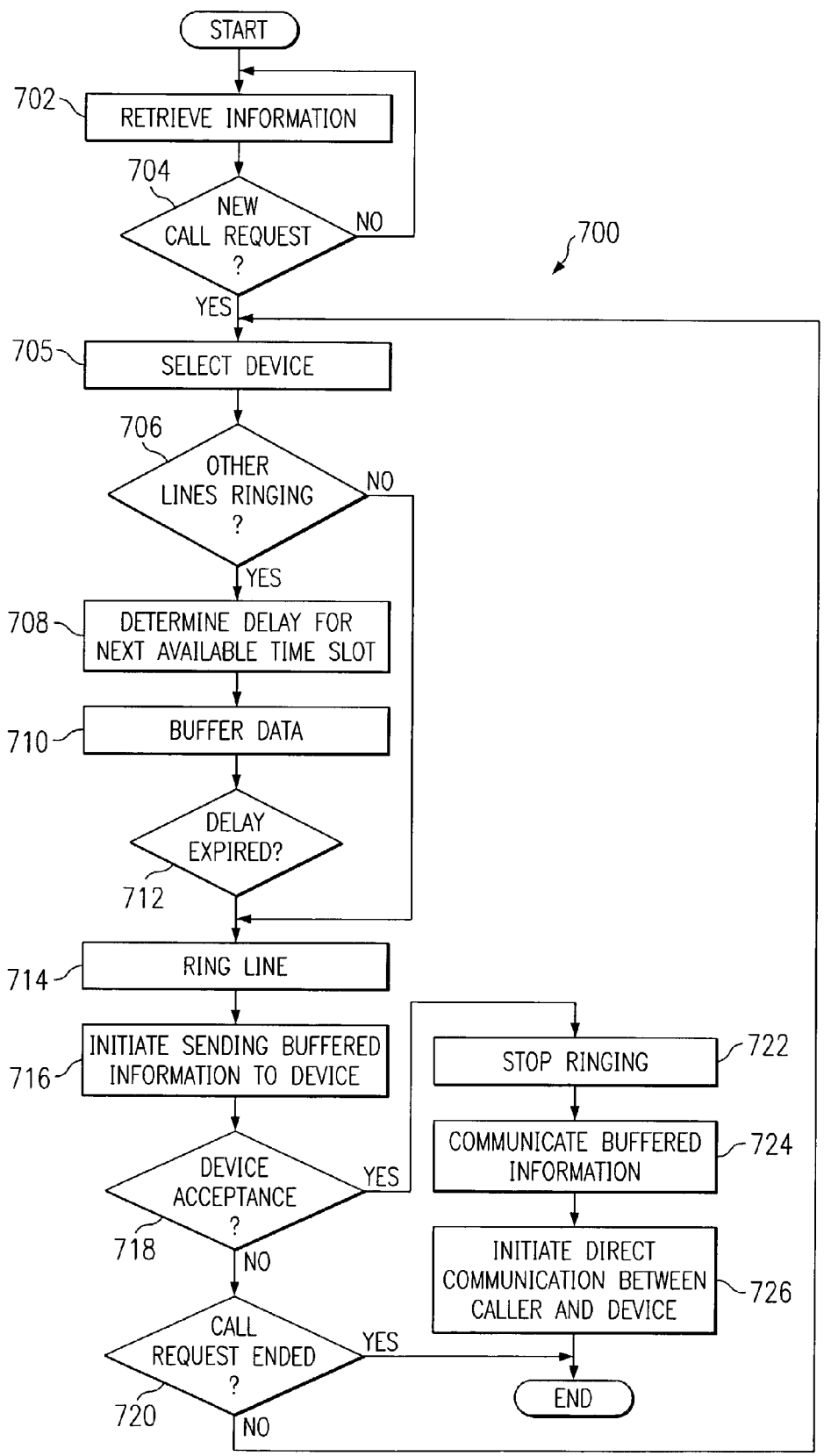

LINE-POWERED NETWORK INTERFACE DEVICE

RELATED APPLICATIONS

This application claims the priority benefit of U.S. patent application Ser. No. 09/947,038 filed Sep. 4, 2001 entitled "System and Method for Providing Lifeline Telecommunication Service to Line-Powered Customer Premises Equipment."

TECHNICAL FIELD OF THE INVENTION

This invention relates in general to telecommunications, and more particularly to a line-powered network interface device (NID).

BACKGROUND OF THE INVENTION

Digital subscriber line (DSL) technology was initially deployed to provide data-only service as a replacement for slower-speed, dial-up modems. Incumbent local exchange carriers (ILECs), competitive local exchange carriers (CLECs), and other telecommunications providers have begun offering voice over DSL (VoDSL) service to deliver integrated voice and data services. Such VoDSL systems often suffer from unreliability due to power or equipment failure at the customer premises. Because of these limitations, many VoDSL networks are less reliable than traditional telephone systems. At the same time, VoDSL networks must comply with existing system specifications for power consumption and operating conditions, which makes the task of improving VoDSL systems difficult.

SUMMARY OF THE INVENTION

In accordance with the present invention, the disadvantages and problems associated with failure of customer premises equipment in a voice over digital subscriber line (VoDSL) network have been substantially reduced. In particular, certain embodiments of the present invention allow a line-powered network interface device (NID) to power DSL transceivers using line power in compliance with network standards. In addition, certain embodiments of the present invention comply with existing product specifications and standards.

In one embodiment, a network interface device includes a first interface, a power extractor, a transceiver, and a second interface. The first interface receives a signal that includes both power and packetized information. The power extractor extracts the power from the signal and powers the transceiver. The transceiver extracts the packetized information from the signal and communicates the information to a user device using the second interface.

In another embodiment, a method for communicating information using a network interface device includes receiving a signal at a first interface and extracting power from the signal. The method also includes powering a transceiver using the power from the signal, and extracting the information from the signal using the transceiver. The method further includes communicating the information to a user device using a second interface.

In still another embodiment, a network interface device includes a first interface coupled to a twisted pair line, a power extractor, a transceiver that includes DSL modulation and demodulation circuitry, a second interface for communicating information to a user device, and a housing. The first interface receives a modulated DSL signal and power from the twisted pair line. The power extractor extracts power from the line and powers the transceiver. The transceiver demodulates the signal to extract information, and communicates the information to a user device using the second interface. The housing secures to a building and encloses other components of the network interface device.

Important technical advantages of certain embodiments of the present invention include power-saving measures that allow a customer premises NID to operate using limited line power. This allows the NID to function without having to resort to batteries or customer premises power, which may fail or otherwise become unreliable. Furthermore, it allows full functionality under all ordinary network conditions regardless of the power conditions at the customer premises, making the NID more versatile.

Other important technical advantages of certain embodiments of the present invention include compliance with existing telecommunications standards. Certain embodiments of the present invention provide required telecommunications services, such as ringing, in compliance with existing network specifications while still operating within prescribed parameters for voltage, power consumption, and temperature. Because of this compliance, the devices may be integrated into existing telecommunication systems.

Yet another technical advantage of certain embodiments of the present invention is the capability of generating a staggered ringing signal. Certain embodiments of the present invention buffer data during ringing generation, so that the NID can ring communication devices in a sequence without losing data. This allows the NID to use less power for ringing devices without losing any information for the communication devices.

Numerous other technical advantages will be apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which:

FIG. 7 is a flow chart showing a method for staggered ringing using the NID.

DETAILED DESCRIPTION OF THE INVENTION

Figure 1:
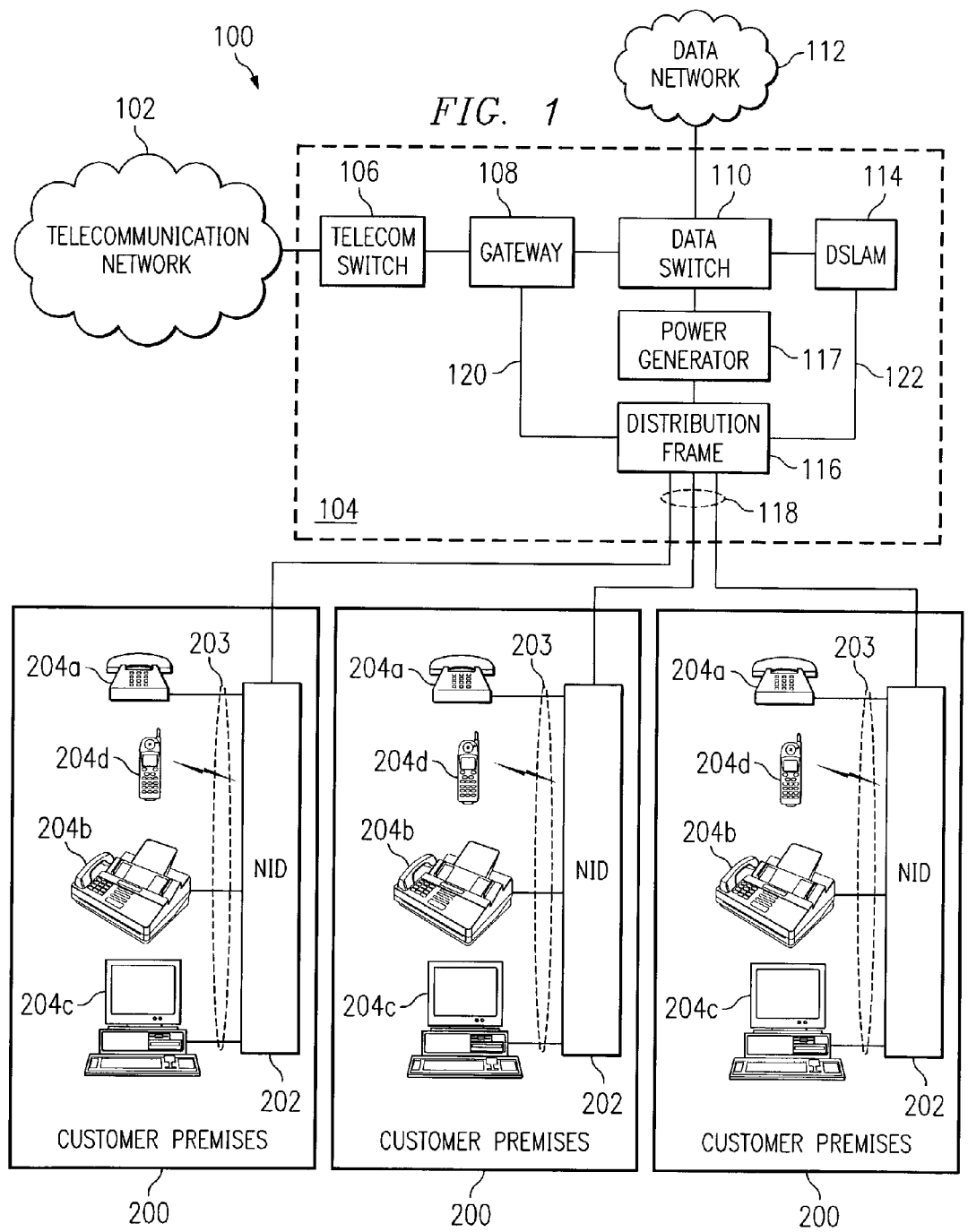
FIG. 1 illustrates a telecommunications system including a NID according to an embodiment of the present invention.

FIG. 1 shows a system 100 for communicating telecommunication information between a telecommunications network 102 and customer premises equipment 200 using local loop circuits 118. Telecommunications network 102 may be a public switched telephone network (PSTN), a private switched telephone network, or any other interconnected collection of telecommunications devices. Telecommunication information includes voice, video, data, image, or any other type of information that may be communicated over telecommunications network 102. In a particular embodiment, local loop circuits 118 are twisted pair lines between network equipment 104 and customer premises equipment 200.

Network equipment 104 communicates telecommunication information between telecommunication network 102 and customer premises equipment 200 using local loop circuits 118. Network equipment 104 may include a telecommunication switch 106, a gateway 108, a data switch 110, a digital subscriber line access multiplexer (DSLAM) 114, a power generator 117, and a distribution frame 116. Network equipment 104 may be located in one or more buildings, closets, or other locations. In a particular embodiment, network equipment 104 is located in a central office, remote terminal, or other telecommunication site.

Telecommunication switch 106 communicates telecommunication information between telecommunications network 102 and gateway 108. Telecommunication switch 106 may be a class 4 switch, a class 5 switch, or any other suitable switch for communicating telecommunication information between telecommunication network 102 and gateway 108. Telecommunication switch 106 and gateway 108 may communicate telecommunication information using GR-303, TR-8, signaling system 7 (SS7), V5, integrated services digital network (ISDN), unbundled analog lines, or any other suitable interface.

Gateway 108 communicates telecommunication information between telecommunication switch 106 and customer premises equipment 200 using data packets or telephone signals. Gateway 108 receives telecommunication information from switch 106 and generates data packets for communicating the telecommunication information to customer premises equipment 200. Gateway also receives data packets communicating telecommunication information from customer premises equipment 200 and processes the data packets to generate telecommunication information for communication to switch 106. Gateway 108 may also receive a telephone signal communicating telecommunication information from customer premises equipment 200 and may process the telephone signal to generate telecommunication information for communication to switch 106. The information in the telephone signal may be encoded as an analog signal, digital signal, or any other suitable form of signal.

One or more data switches 110 communicate data packets containing telecommunication information between gateway 108 and DSLAM 114. Data switches 110 may also communicate data packets between a data network 112 and DSLAM 114. Data network 112 may include a wide area network (WAN), a local area network (LAN), the Internet, or any other interconnected collection of switches, routers, hubs, and other data communication devices that provide data services.

DSLAM 114 communicates data packets between data switch 110 and NID 202 using DSL technology. DSLAM 114 receives data packets from data switch 106, processes the data packets to generate DSL data, and communicates the DSL data over local loop circuit 118 to NID 202. DSLAM 114 also receives DSL data from local loop circuit 118, identifies data packets generated by NID 202, and communicates the data packets to data switch 110. Asymmetric DSL (ADSL), integrated DSL (IDSL), symmetric DSL (SDSL), high-data rate DSL (HDSL), rate-adaptive DSL (RADSL), very-high data rate DSL (VDSL), DSL-LITE, or other forms of DSL technology allow data transmissions over local loop circuit 118 at greater speeds than offered by traditional dial-up modems. As a result, system 100 uses DSL technology to support broadband-based, telecommunication services over local loop circuit 118.

Distribution frame 116 communicates analog telephone signals between gateway 108 and customer premises equipment 200 and communicates DSL data between DSLAM 114 and customer premises equipment 200. Distribution frame 116 receives telephone signals from lines 120 and DSL data from DSL lines 122 and communicates the telephone signals and DSL data over local loop circuits 118 to NIDs 202. Distribution frame 116 also receives telephone signals and DSL data from local loop circuits 118 and communicates the telephone signals to gateway 108 using lines 120 and the DSL data to DSLAM 114 using DSL lines 122. Telephone signals may include any suitable signal, including analog or digital information.

Power generator 117 generates a DC voltage for electrical signals communicated to NID 202 using distribution frame 116. Power generator 117 may generate the voltage based on voltage received from a central office, remote terminal, or any other suitable power source. The DC voltage in the signal is used by NID 202 to support packet communication. Because of external restrictions, such as product safety standards restricting the amount of voltage that may be drawn or power consumed in a local loop circuit 118, there may be a limit to the amount of voltage that may be presented to NID 202. Therefore, in order for NID 202 to be integrated into existing telecommunications networks, NID 202 should operate using no more than the described voltage or power requirements.

NID 202 communicates telecommunication information between network equipment 104 and subscriber links 203. Each subscriber link 203 may support one or more subscriber devices 204a, 204b, 204c, and 204d (collectively, subscriber devices 204). Subscriber devices 204 may include telephones 204a, facsimile machines 204b, computers 204c, wireless devices 204d, or any other suitable terminal devices that communicate telecommunication information with telecommunication network 102. Subscriber devices 204 may couple to subscriber links 203 using wireline, wireless, or any other suitable communication paths.

NID 202 communicates telecommunication information with network equipment 104 using a telephone signal or data packets. NID 202 receives data packets from local loop circuit 118 and processes the data packets to generate telephone signals for communication to subscriber links 203. NID 202 also receives, from subscriber links 203, telephone signals communicating telecommunication information from subscriber devices 204 and processes the analog telephone signals to generate data packets for communicating the telecommunication information to network equipment 104. NID 202 may also communicate a telephone signal between network equipment 104 and at least some of subscriber lines 203. NID 202 also performs other telecommunication functions, such as ringing subscriber devices 204 to indicate an incoming communication request, communicating caller identification information to subscriber devices 204, or performing any other suitable task for communicating information to subscriber devices 204.

In a first mode of operation, switch 106 receives information from telecommunication network 102 and communicates the information to gateway 108. Gateway 108 receives the information and generates data packets for communicating the information to customer premises equipment 200. Data switch 110 receives packets information from gateway 108 and data network 112 and routes them to DSLAM 114. For example, data switch 110 may receive voice service from telecommunications network 102 and data service, such as Internet access, email, and other network applications, from data network 112. DSLAM 114 generates DSL signals from the packets and communicates them to the appropriate NIDs 202 using local loop circuits 118 from the distribution frame 116. Power generator 117 generates a voltage for an electrical signal used to communicate the DSL signals to NIDs 202.

NIDs 202 receive the electrical signals from DSLAM 114 and convert the signal into a suitable form for subscriber devices 204 using the power in the signal. NIDs 202 also perform any necessary functions using the power in the signal, including ringing subscriber devices 204. Because no additional power is required other than the power communicated in the signal, NIDs 202 may function even when customer premises power is interrupted.

System 100 may also have a second mode of operation in case of a failure in network equipment 104. For example, if DSLAM 114 fails, network equipment 104 may be unable to communicate digital or packetized information to NID 202. In that case, system 100 may pass telephone signals directly from telecommunications network 102 to subscriber devices 204 by communicating them over lines 120 using power in the signals, which is −48 V in a particular embodiment. In the second mode of operation, NID 202 acts to pass the signals to back-up devices such as telephones 204a and fax machines 204b. NID 202 similarly receives telephone signals from subscriber devices 204 and communicates them to telecommunications network 102. Thus, NID 202 provides communication between subscriber devices 204 and telecommunications network 102 even when network equipment 104 fails.

Figure 2:
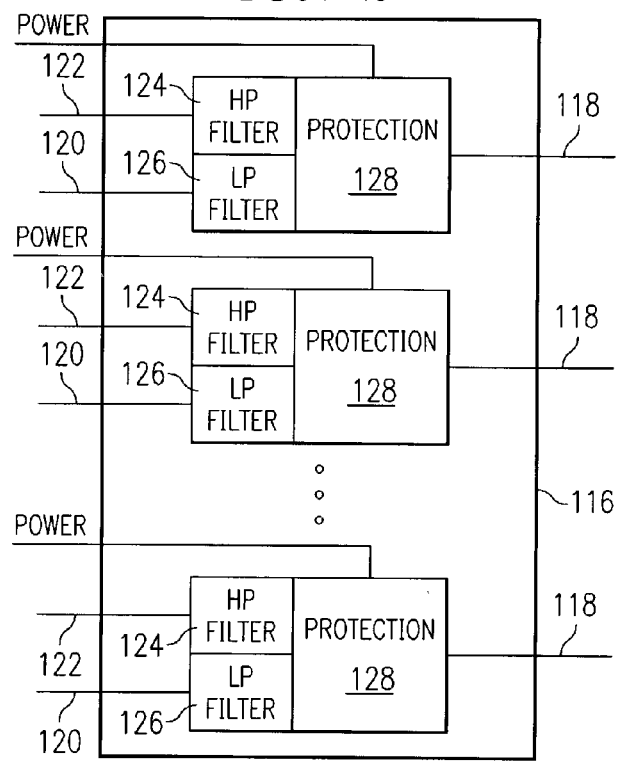
FIG. 2 illustrates a distribution frame in the telecommunications system of FIG. 1.

FIG. 2 illustrates distribution frame 116 that communicates data packets and telephone signals over local loop circuits 118. Distribution frame 116 couples DSL lines 122 and lines 120 to local loop circuits 118 using high pass filters 124, low pass filters 126, and line protection circuits 128. High pass filters 124 isolate digital DSL data communicated over DSL lines 122, and low pass filters 126 isolate telephone signals communicated over lines 120. Line protection circuits 128 provide voltage protection in case of lightning strikes or AC line cross incidents.

Figure 3:
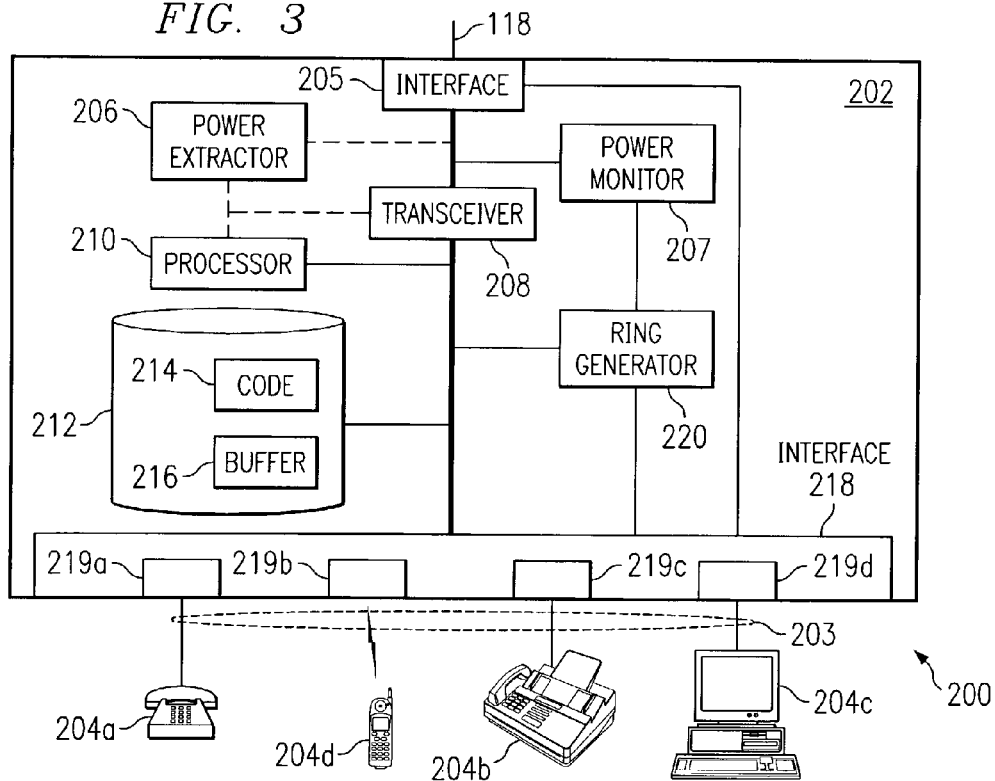
FIG. 3 illustrates the NID of FIG. 1 in more detail.

FIG. 3 illustrates one example of customer premises equipment 200. Customer premises equipment 200 includes NID 202 and subscriber links 203 to subscriber devices 204. NID 202 includes a first interface 205, a power extractor 206, a transceiver 208, a processor 210, a memory 212, a second interface 218, and a ring generator 220.

First interface 205 represents any port or connection for receiving signals from local loop circuit 118. First interface 205 also communicates signals to network equipment 104 using local loop circuit 118. First interface 205 may also perform processing of signal, including filtering and/or splitting the signal into components, such as different frequency bands. In one embodiment, voice service is allocated to a first frequency band, while data service is allocated to a second frequency band. In the case where network equipment 104 becomes unable to communicate digital information, first interface 205 may bypass digital processing equipment, such as transceiver 208 and processor 210, and instead pass particular signals, such as signals in a certain frequency band, directly to second interface 218. In a particular embodiment, first interface 205 receives electrical signals communicated on a twisted pair line.

Power extractor 206 represents any device for extracting power from signals received at first interface 205. Power extractor 206 provides power for processor 210, transceiver 208 and ring generator 220. In a particular embodiment, power extractor 206 removes a DC voltage supplied to local loop circuit 118 by power generator 117. Power extractor 206 may extract power from the signal using a low-pass filter, while the information content of the signal is extracted using a high-pass filter. Power extractor 206 may be bypassed in cases where network equipment 104 is unable to supply digital information, such as when one or more components of network equipment 104 fail. In such a case, there is no need to power digital processing equipment, and rather than passing signals to power extractor 206, first interface 205 may bypass power extractor 206.

Transceiver 208 represents any device or combination of devices for decoding packetized information from signals received from first interface 205. Transceiver 208 performs any appropriate processing tasks to extract information from electrical signals. Transceiver 208 may also receive information from processor 210 and encode the information in a suitable form for communication on local loop circuit 118. Transceiver 208 receives power to perform its various tasks from power extractor 206. In a particular embodiment, transceiver 208 represents DSL modulation and demodulation circuitry. Such circuitry may consume a significant portion of the available power in NID 202.

Processor 210 represents any hardware and/or software for processing information. Processor 210 may include a microprocessor, micro-controller, digital signal processor (DSP), or any other suitable component or components. Processor 210 may be a separate device from transceiver 208, but the functions of processor 210 and transceiver 208 may be performed by a single component as well. Processor 210 may route the information from transceiver 208 to subscriber devices 204 using second interface 218. Processor 210 may encode, packetize, or otherwise process information from transceiver 208 or subscriber devices 204 as well. Processor 210 may also route information from subscriber devices 204 to transceiver 208 for encoding and communication on local loop circuit 118. Processor 210 may also control other components of NID 202, such as ring generator 220.

Memory 212 represents any form of information storage. Memory 212 may include optical media, magnetic media, volatile storage, non-volatile storage, removable media, local components, remote components, or any other form of information storage accessible by components of NID 202. Memory 212 stores code 214 executed by processor 210 to perform its various tasks. In a particular embodiment, code 214 allows processor 210 to perform tasks in a manner compliant with the ATM Forum's Broadband Loop Emulation Services (BLES) standard, an open standard providing interoperability for VoDSL devices. BLES uses ATM (asynchronous transfer mode) adaptation layer 2 (AAL2) trunking to communicate voice, voice-band data, fax traffic, ISDN B- and D-channels, and other forms of information on a single ATM trunk connection. BLES-compliance allows NID 202 to be integrated with other systems using BLES, making NID 202 usable with a wide variety of telecommunications equipment. Memory 212 also includes a buffer 216. Buffer 216 stores information received by processor 206 so that communication of the information to subscriber devices 204 or local loop circuit 118 may be delayed. Such a feature is useful when processor 206 performs other tasks, such as ringing, caller identification, preview screens, or any other suitable function, in a manner so that some information, such as caller ID information or ringing signals, would overlap or interfere with the communication of other information.

Second interface 218 represents any coupling, physical or virtual, from NID 202 to subscriber links 203. Second interface 218 may include multiple ports 219, each coupled to a subscriber link 204. Second interface 218 allows NID 202 and subscriber devices 203 to exchange information. Second interface 218 may communicate both analog and digital signals to subscriber devices 204, including all types of telecommunication information. Second interface 218 may also communicate power signals to subscriber devices 204 that may be used by the devices to perform tasks such as ringing, displaying alerts, activating a display, or any other suitable task.

Ring generator 220 represents any hardware and/or software for producing ring signals. In a particular embodiment, ring generator 220 produces a powered signal at 20 Hz. The 20-Hz frequency signal triggers a subscriber device 204 to emit a characteristic tone or other indication of an incoming communication. Subscriber devices 204 draw power from the ring signal to produce the indication. Consequently, ring generator 220 consumes available power from power extractor 206 when ringing subscriber devices 204.

In operation, NID 202 receives a signal that includes packetized information and power from local loop circuit 118 using first interface 205. Power extractor 206 extracts power from the signal and powers transceiver 208 and processor 210. Transceiver 208 and/or processor 210 decode the information in signal and convert the information into a suitable form for the particular subscriber device 204 to which the information is directed. For example, if subscriber device 204 is suitable for receiving packets, processor 210 or transceiver 208 may communicate the packets directly to subscriber device 204. If subscriber device 204 is an analog device, processor 210 or transceiver 208 may convert the information from a packetized form into an analog signal and communicate the analog signal to subscriber device 204. Processor 210 may also communicate power from power extractor 206 to power subscriber devices 204. For example, processor 210 may communicate a signal that provides power for ringing subscriber devices 204 as well as communicating information.

NID 202 also receives information from subscriber devices 204. Second interface 218 receives information from subscriber links 203. This information may include analog or digital information. Processor 210 decodes the information and converts the information into a usable format. For example, if the information was being communicated from an analog subscriber device 204 to a voice-over-Internet-protocol (VoIP) device, processor 210 would convert the analog information received from subscriber device 204 into IP packets. Processor 210 communicates the converted information to transceiver 208, which converts the information into a signal suitable for local loop circuit 118. In a particular embodiment, transceiver 208 converts the information into a modulated DSL signal.

External constraints may limit the amount of power available to NID 202. For example, TELCORDIA document GR-1089-CORE, section 7 (Issue 2, December 1997), specifies electrical safety standards for telephone network equipment. These standards specify a maximum continuous voltage of 200 V with a current of 5 mA or less. Such standards may also fix loop impedances and limit the maximum operating temperature for safety reasons. Given fixed properties for communication media, such as wire gauges for telephone wire, the voltage limits may provide an upper limit on the available power. In order to operate under these conditions, the transceiver 208 may only consume an amount of power within the available range. Numerous power conservation techniques, some examples of which are described below, may be employed within NID 202 to keep NID 202 within the required operating parameters.

One example of power conservation is staggered ringing. Certain subscriber devices 204 do not have independent power sources but instead draw their power from NID 202 to produce rings. If several devices 204 must be triggered to ring at once, the power drain on NID 202 is particularly severe. Consequently, simultaneous ringing places considerable strain on the ability of NID 202 to function within the described power constraints.

Staggered ringing allows NID 202 to ring devices 204 in sequence rather than simultaneously, thus dividing the single large power drain into a series of smaller power drains within the capacity of power extractor 206. In traditional telephone systems, staggered ringing is undesirable because the timing of ringing signals is designed to be interleaved with other information, such as caller ID. An advantage of staggered ringing in NID 202 is that information may be buffered in buffer 216 so that it is not lost when a ringing signal is communicated when other information would ordinarily be communicated on a connection. This allows NID 202 to save power while simultaneously providing fully equivalent service to traditional systems. Furthermore, processor 210 may convert information from digital to analog format and from continuous to packetized form as needed in order to most efficiently carry out the information transfer. In addition, direct ringing may still be used for analog signals in the event of a failure in network equipment 104.

Other power management techniques include selecting particular amplifier topologies in ring generator 220. Particular amplifier topologies may provide increased efficiency in the ringing process by limiting the amount of power in the ringing signal to the minimum necessary. By conserving power in the ringing process, particular embodiments of NID 202 may be powered using only line power, rather than having to depend on the power supplied by customer premises.

As mentioned earlier, external constraints may limit the amount of available power to NID 202. In certain cases, including complete or partial failure of power extractor 206, ringing devices 204 may require more power than NID 202 can extract from local loop 118. NID 202 may include power monitor 207 to provide power protection in such cases. Power monitor 207 represents hardware and/or software that monitors the power level received from local loop circuit 118 to determine whether there is sufficient power to generate ringing signals at a particular output level. If insufficient power is available, power monitor 207 may lower the output level of ring signals produced by ring generator 220 in order to conserve power. Although this may result in some or all of devices 204 not ringing successfully, the reduction in output levels allows NID 202 to function at least partially even under adverse power conditions. Power monitor 207 may also record failures and provide failure notifications to facilitate correction of the adverse situation limiting the available power for NID 202.

Although particular embodiments of NID 202 and the power management techniques used for NID 202 have been described, numerous variations will be apparent to one skilled in the art. For example, transceiver 208 may perform packetizing and depacketizing as well as DSL modulation and demodulation. Power extractor 206 is adaptable to multiple signal types as well. NID 202 is also adaptable to any number of protocols and methods of encoding information.

Figure 4:
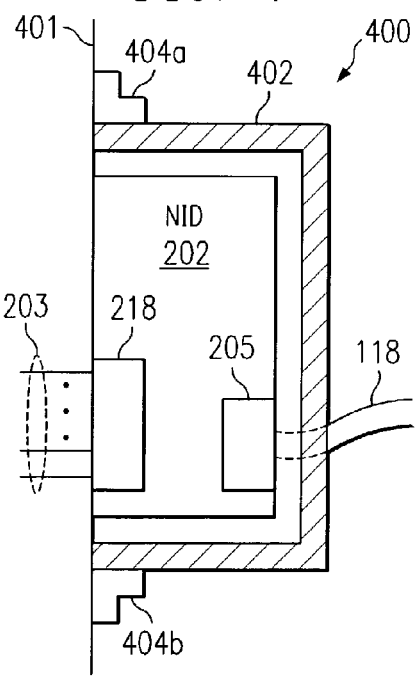
FIG. 4 illustrates the NID of FIG. 3 enclosed in a housing secured to a building.

FIG. 4 shows a particular embodiment of NID 202 as installed outside of a residence, office building, or other customer premises. NID 202 is encased within a housing 402 and attached to a building 401 using brackets 404. Housing 402 represents any form of enclosure for protection of NID 202. Housing 402 may be formed from any number of suitable materials, including various kinds of metals, plastic, glass, or combinations of those materials. Housing 402 protects electrical components of NID 202 from weather, vandalism, accidental damage, or any other routinely encountered danger to the regular operation of NID 202. Brackets 404 represent any suitable device for attaching housing 402 to building 401. Brackets may be integral to NID 202, permanently attached to building 401, removably attached to building 401 or NID 202, or otherwise suitably coupled to building 401 and NID 202. Brackets may be screwed, bolted, welded, or otherwise attached to building 401 and/or NID 202.

Figure 5:
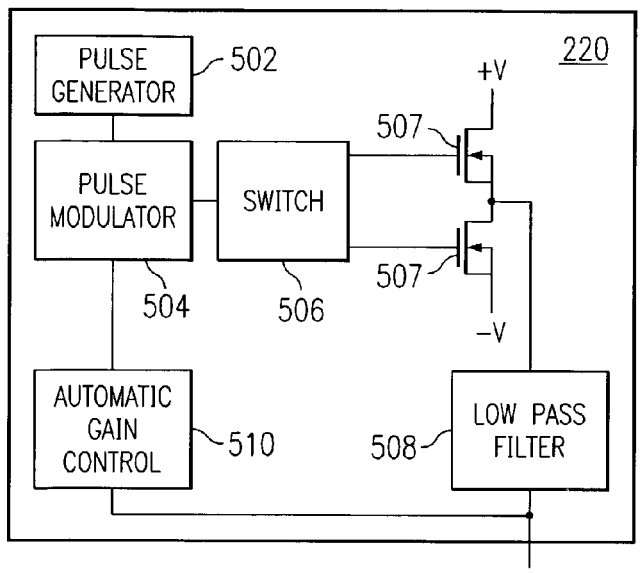
FIG. 5 illustrates a ring generator in the NID.

FIG. 5 illustrates a particular embodiment of ring generator 220. The depicted ring generator includes an amplification circuit known as a Class D amplifier configuration. In the Class D amplifier, output transistors are driven to a rail voltage for a certain length of time depending on the amplitude of the input signal. The higher the amplitude of the input signal, the more prolonged is the output of the output transistor.

Ring generator 220 includes a pulse generator 502, a pulse modulator 504, a switch 506, output transistors 507, a low-pass filter 508, and an automatic gain control module 510. Pulse generator 502 produces a 20 Hz sinusoidal signal. The pulse may be produced using a DSP, crystal oscillator, or other calculation tool. Alternatively, the pulse may be received from outside ring generator 220, as in the case where processor 210 generates the pulse. Pulse modulator 504 represents hardware and/or software for converting the signal into digital form. Switch 506 switches between output transistors 507 to determine which one is active at a given time. Low-pass filter 508 extracts the 20 Hz signal from the output of transistors 507 while filtering out high frequency noise. Automatic gain control 510 detects the power expended in the output signal and adjusts the amplitude of the signal from pulse modulator 504 to keep the output transistors 507 driven to the rail voltage for no longer than is necessary to generate a clean output signal from ring generator 220.

Figure 6:
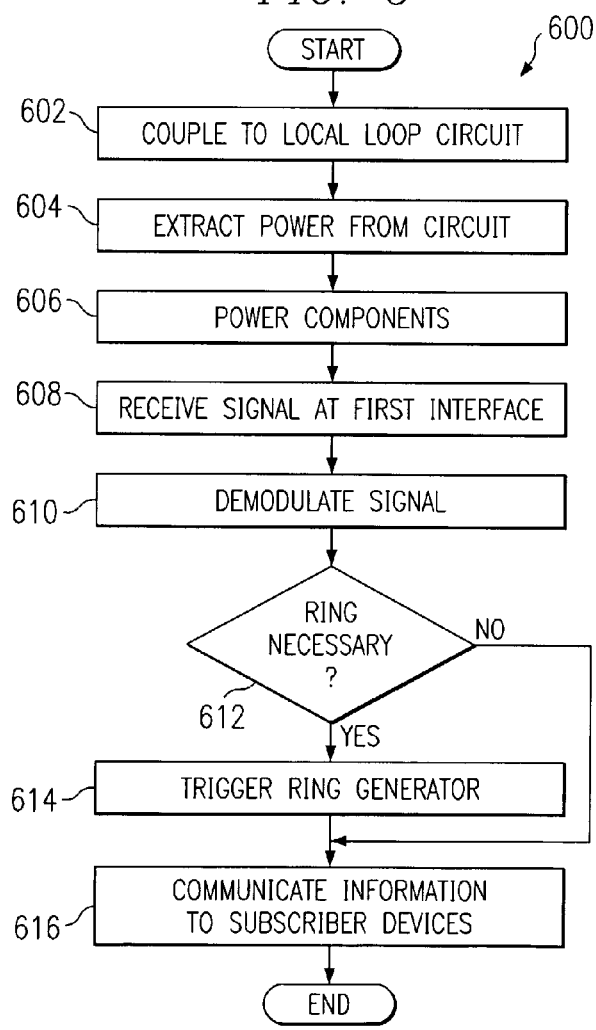
FIG. 6 is a flow chart showing a method of communicating information using the NID.

FIG. 6 is a flow chart 600 showing one example of a method of NID 202 operation. NID 202 couples to a local loop circuit 118 at step 602. NID 202 extracts power from the local loop circuit 118 at step 604, and continues to extract power during operation. NID 202 powers transceiver 208, processor 210 and ring generator 220 using this power at step 606.

At step 608, NID 202 receives a DSL signal from local loop circuit 118 at first interface 205. NID 202 demodulates the signal at step 610. NID 202 determines whether the incoming information requires a ringing sequence at step 612. If a ring is necessary, NID 202 triggers ring generator 220 at step 614. NID 202 then communicates information to subscriber devices 202 at step 616.

FIG. 7 shows a flowchart 700 depicting one example of a method for staggered ringing. According to convention in North America, ringing is allocated in time intervals of six seconds, each six-second time slot including two seconds of active ringing and four seconds of inactivity. One method of staggered ringing is to have different devices actively ringing at different two-second time slots within the six-second time interval. One example of such a method is described below.

At step 702, NID 202 retrieves telecommunication information from an incoming signal. NID 202 determines if the information includes a new call request at step 704. If a new call request is not included, NID 202 may continue retrieving information from incoming signals at step 702. If a new call request is included, NID 202 then rings one or more of the devices 204 to which the call request is directed. NID 202 selects a device 204 to ring at step 705. NID 202 then determines whether any other devices 204 are being rung at step 706. If no other device is being rung, NID 202 communicates a ringing signal to the device 204 using the line to the device 204 at step 708.

If another device 204 is being rung, NID 202 delays ringing additional devices 204 in order to stagger the ringing. NID 202 determines a delay period before the next available ringing time slot at step 708. During the delay, NID 202 buffers received data at step 710. NID 202 continues to buffer data until the delay expires, as illustrated by the logic of step 712. At the expiration of the delay, NID 202 rings device 204 at step 714.

At step 716, NID 202 initiates sending of part or all of the buffered information to device 204, including the call request. NID 202 determines if the call request is accepted by device 204 at step 718. If the request is not yet accepted, NID 202 determines if the call request has been ended by the caller at step 720. If the call request has not been ended, NID 202 continues the staggered ringing process from step 705.

If the call request is accepted by device 204, NID stops the ringing process at step 722. NID 202 forwards any remaining buffered information to device 204 at step 724. NID 202 may then establish a direct, unbuffered communication connection between device 204 and the caller at step 726.

Although a particular embodiment of staggered ringing has been described, numerous variations will be apparent to one skilled in the art. For example, the method described may be adapted to allow for a number of devices 204 greater than the number of available time slots. In that case, devices 204 may be divided into groups, and NID 202 may ring a particular group during a given time slot. The method may also be modified to use different time slots, ringing intervals, or sequences.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A network interface device, comprising:
    a first interface operable to receive a signal from a local loop circuit, the signal comprising power and packetized information;
    a power extractor operable to extract the power from the signal;
    a transceiver powered by the power extractor and operable to extract the information from the signal;
    a second interface operable to communicate the information to a user device;
    a ring generator operable to produce a ring signal for the user device, the ring generator comprising:
        a pulse modulator operable to generate a digital output signal in response to an input signal;

a first output transistor operable to produce a first output voltage for a first duration determined based on an amplitude of the input signal;

a second output transistor operable to produce a second output voltage for a second duration determined based on the amplitude of the input signal;

a switch operable to switch between the first output transistor and the second output transistor in response to a zero crossing in the input signal; and a low-pass filter operable to convert output of the output transistors into an analog signal; an an automatic gain controller operable to:

monitor a power level of the analog signal; and adjust an amplification level of the digital output signal based on the power level of the analog signal.

2. The device of claim 1, further comprising:

a housing enclosing the power extractor and the transceiver; and wherein the housing is securable to an exterior wall of a building.

3. The device of claim 1, further comprising:

a processor operable to trigger the ring generator; and a memory operable to store the information extracted from the signal during ringing of the user device.

4. The device of claim 3, wherein:

the second interface is coupled to a plurality of user devices; and the processor is further operable to trigger the ring generator to ring the user devices in succession.

5. The device of claim 1, wherein:

the transceiver comprises DSL modulation and demodulation circuitry; and the signal is a modulated DSL signal.

6. The device of claim 1, wherein the local loop circuit comprises a twisted pair line.

7. A network interface device, comprising:

a first interface coupled to a twisted pair line and operable to receive a modulated DSL signal comprising packetized information and power;

a power extractor operable to extract the power from the signal;

a transceiver comprising DSL modulation and demodulation circuitry operable to demodulate the modulated DSL signal to extract the packetized information;

a second interface operable to communicate the packetized information to a user device;

a housing enclosing the first interface, the power extractor, the transceiver and the second interface, the housing adapted to be secured to a building; and a ring generator comprising:

a pulse modulator operable to generate a digital output signal in response to an input signal;

a first output transistor operable to produce a first output voltage for a first duration determined based on an amplitude of the input signal;

a second output transistor operable to produce a second output voltage for a second duration determined based on the amplitude of the input signal;

a switch operable to switch between the first output transistor and the second output transistor in response to a zero crossing in the input signal; and a low-pass filter operable to convert output of the output transistors into an analog signal; and an automatic gain controller operable to:

monitor a power level of the analog signal; and adjust an amplification level of the digital output signal based on the power level of the analog signal.

8. The device of claim 7, further comprising:

a memory operable to store the information extracted from the DSL modulated signal; and a processor operable to:

trigger the ring generator to produce a ringing signal for the user device; and communicate the information to the user device after the ringing signal is communicated to the user device.

9. The device of claim 8, wherein:

the second interface is coupled to a plurality of user devices; and the processor is further operable to trigger the ring generator to generate a ringing signal for each of the plurality of user devices in a predetermined sequence.

10. The device of claim 7, wherein the transceiver is operable to encode and decode information in accordance with the ATM Forum's Broadband Loop Emulation Standard (BLES).

* * * * *